United States Patent [19]

Boirat et al.

[11] Patent Number: 4,653,849

[45] Date of Patent: Mar. 31, 1987

[54] OPTICAL SPACE-DIVISION SWITCHING ASSEMBLY

[75] Inventors: Robert Boirat, Roinville; Philippe Faugeras, Boulogne-Billancourt; Denis Haux, Etampes; Jacques Mimeur, Veyrier du Lac, all of France

[73] Assignee: Compagnie Industrielle des Telecommunications Cit-Alcatel, France

[21] Appl. No.: 615,601

[22] Filed: May 30, 1984

[30] Foreign Application Priority Data

May 31, 1983 [FR] France .................................. 83 08969

[51] Int. Cl.$^4$ .............................................. G02B 6/40
[52] U.S. Cl. ............................. 350/96.22; 350/96.15; 350/96.21
[58] Field of Search ...................... 250/227; 350/96.15, 350/96.20, 96.21, 96.22, 96.24

[56] References Cited

U.S. PATENT DOCUMENTS

| | | | |
|---|---|---|---|
| 3,920,982 | 11/1975 | Harris | 350/96.24 |
| 3,977,762 | 8/1976 | Sandbank | 350/96.24 |
| 4,070,093 | 1/1978 | Schwartz | 350/96.24 |
| 4,444,458 | 4/1984 | Stowe et al. | 350/96.15 |
| 4,528,695 | 7/1985 | Khoe | 350/96.15 |

FOREIGN PATENT DOCUMENTS

| | | | |
|---|---|---|---|
| 2523496 | 12/1976 | Fed. Rep. of Germany | ... 350/96.24 |
| 3012450 | 10/1981 | Fed. Rep. of Germany . | |
| 3127574 | 4/1983 | Fed. Rep. of Germany . | |
| 2331801 | 6/1977 | France . | |
| 2479993 | 10/1981 | France . | |
| 76301 | 6/1980 | Japan | 350/96.20 |
| 1125 | 1/1983 | Japan | 350/96.24 |
| 58-68702 | 4/1983 | Japan . | |

OTHER PUBLICATIONS

Bloem et al., IBM Tech. Disc. Bull., 16(1), Jun. 1973, "Fiber-Optic Coupler," pp. 146–147.

*Primary Examiner*—William L. Sikes
*Assistant Examiner*—Frank González
*Attorney, Agent, or Firm*—Sughrue, Mion, Zinn, Macpeak, and Seas

[57] ABSTRACT

An optical space-division switching assembly comprises a distribution assembly consisting of a stack of P distribution plates each with N guides which on the one hand, for each plate, are coupled in common to the end face of an optical element assigned to the plate and belonging to a group of P elements and, on the other hand, for the P plates, communicate with the same side of the stack in N rows of end faces, and an optical selection assembly consisting of a stack of N flat rigid optomechanical switches each movable between an optical element assigned to the switch and belonging to another group of N elements and the corresponding row of end faces of the guides of the plates and incorporating P guides having first ends assigned to the individual links between these guides and the corresponding optical element and second ends individually assigned to the P end faces of the guides of the plates of the corresponding row. This assembly provides for the broadcasting of P programs to N subscribers.

14 Claims, 7 Drawing Figures

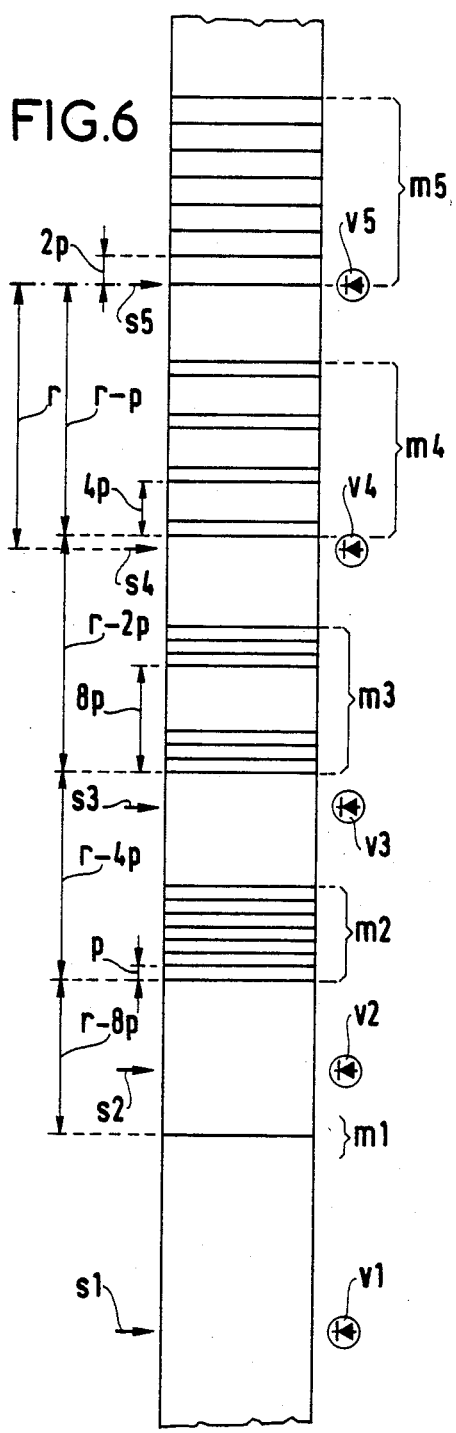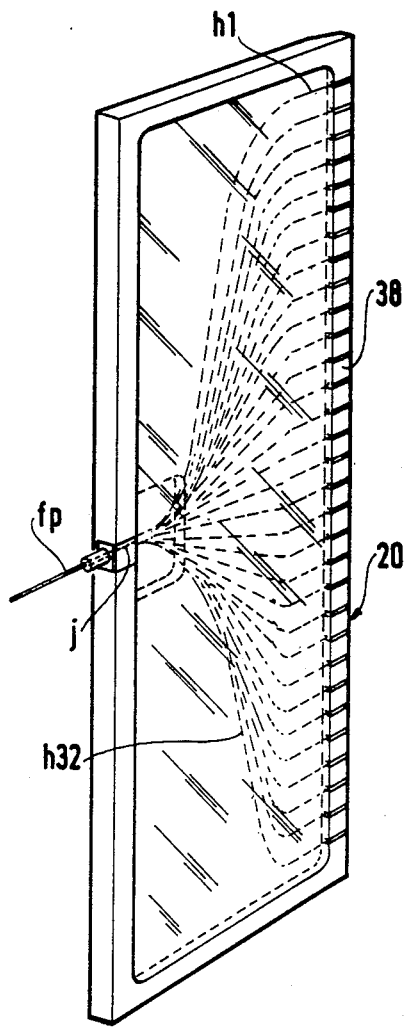

OPTICAL SPACE-DIVISION SWITCHING ASSEMBLY

BACKGROUND OF THE INVENTION

1. Field of the Invention

The present invention concerns optical transmission. It relates in particular to a space-division switching assembly selectively coupling a first group of N end faces of N first separate optical elements and a second group of P end faces of P second separate optical elements. This space-division switching assembly permits, in particular, broadcast transmission of P programs to N subscribers and thus constitutes an optical program broadcast unit.

2. Description of the Prior Art

Generally speaking, in an optical broadcast unit distributing P programs to N subscribers, N optical fibers are assigned to the transmission of each of the P programs for the N subscribers, the P×N resulting fibers being grouped in N groups of P fibers, each assigned to one of the subscribers, whereas an appropriate one of the P fibers in each of the N groups is coupled to the appropriate subscriber fiber so that this subscriber can receive the required one of the P programs available to him.

An optical switch can select one of the P programs for each subscriber.

A mechanical embodiment of an optical switch which provides for obtaining the necessary coupling by deviating a light beam is described in U.S. Pat. No. 4,304,460. This switch comprises a collimator (or focussing) means consisting of a lens and a deviation means consisting of a rotating mirror.

Given the very small dimensions of the optical fibers employed, this switch and, more generally, light deviation type opto-mechanical switches, are of relatively large overall size as compared with that of the fibers and difficult to manufacture if light losses are to be minimised.

Another, also mechanical, embodiment of an optical switch providing for obtaining the necessary coupling by switching a fiber is described in the article "La Commutation optique dans les réseaux locaux de vidéocommunication" by L. Jeunhomme, published in the Thomson-CSF Revue Technique, volume 14, No 3, September 1982, pages 767 to 785. This solution consists in the use for distribution of the program, facing each subscriber fiber of which the end is equipped with a microlens, of a fiber-carrier barrel consisting of a cylinder with peripheral grooves accommodating the ends of the P so-called program fibers, also equipped with microlenses, and in driving the fiber-carrier barrel by means of a micromotor in order to position the required program fiber opposite the subscriber fiber. In the context of its application to an optical program broadcast unit as specifically envisaged here, in which there are as many switches as subscribers, an embodiment of this kind results in overall dimensions which are prohibitive as compared with those of the optical fibers.

Documents Pat. No. FR-A-2 479 993 and DE-A-3 012 450 also describe mechanically operated optical switches. These switches provide direct or crossover coupling between two incident fibers and two emergent fibers. For this purpose they comprise a mobile intermediate plate disposed between the pair of incident fibers and the pair of emergent fibers, carrying two pairs of intermediate fibers by means of which direct coupling results from a first position of the plate and crossover coupling from a second position of the plate.

These switches permit the implementation of matrix type switching systems between 2n input fibers and 2n output fibers by means of successive associations of switches considered as a basic 2×2 switching cell. In the context of application to program broadcasting, such as envisaged hereinabove, these systems would be complex and would not permit the broadcasting of the same program to more than one subscriber at a time.

An objective of the present invention is to provide a space-division switching assembly for selectively coupling end faces of a first group and accesses of a second group for the optical transmission of signals from one of the end faces of one of the two groups to one of the end faces of the other group and, in particular, for the optical broadcasting of P programs to N subscribers, presented in a particularly compact form, using a plurality of switches in the form of modular units possibly of integrated construction and easily reproducible.

SUMMARY OF THE INVENTION

The present invention consists in a space-division optical switching assembly operative between end faces of a first group of N first optical elements and end faces of a second group of P second optical elements, comprising:

an optical distribution assembly consisting of a stack of P optical distribution plates each incorporating N individual waveguides having first end faces coupled in common to the end face of one of said second optical elements to which said plate in question is assigned and second end faces communicating with the edge of this plate, and in which the guides of the various plates have their second accesses on the same side of the distribution assembly arranged in N rows of P second end faces, an optical selection assembly consisting of a stack of N flat rigid opto-mechanical switches individually assigned on the one hand to the N first optical elements of the first group mounted in an array transverse to the individual switches with the same spacing as the successive switches in their stack and on the other hand to the N rows of second end faces of the guides of said plates, said switches being mounted, between the array of the N first optical elements and the stack of the plates, transversely to said plates and in correspondence with said N rows of second end faces, respectively, in which each of said switches incorporates P waveguides spreading in a bundle from the first ends of these guides assigned to the individual connections of these guides with the corresponding first optical element to their second ends assigned individually to the P second end faces of the guides of the plates of the corresponding row, said second ends of the P guides of each switch being relatively arranged amongst themselves in correspondence with the relative arrangement of the P second end faces of the corresponding rows and with the arrangement of said first ends of these P guides to provide for successive individual positioning of these second ends each facing one of said P second endfaces whereas simultaneously, for each of these positions, the first end of the same waveguide is opposite the access of the first optical element to which this switch is assigned, and means for driving each of said switches relative to the end faces of the first optical element to which it is assigned and to the corresponding row of second end faces on the distribution assembly, for the purpose of obtaining P relative positions of this switch for each of which the first optical element in question is selectively coupled to one of the second optical elements through one only of the guides of this switch and one only of the guides of the distribution plate assigned to the second optical element in question.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 6 is a schematic representation of an arrangement of position marker elements for each switch in the switching assembly of FIGS. 3 to 5.

FIG. 7 is a schematic representation of one of optical distribution plates used in the switching assembly of FIGS. 3 to 5.

DESCRIPTION OF THE PREFERRED EMBODIMENTS

Figure 1:
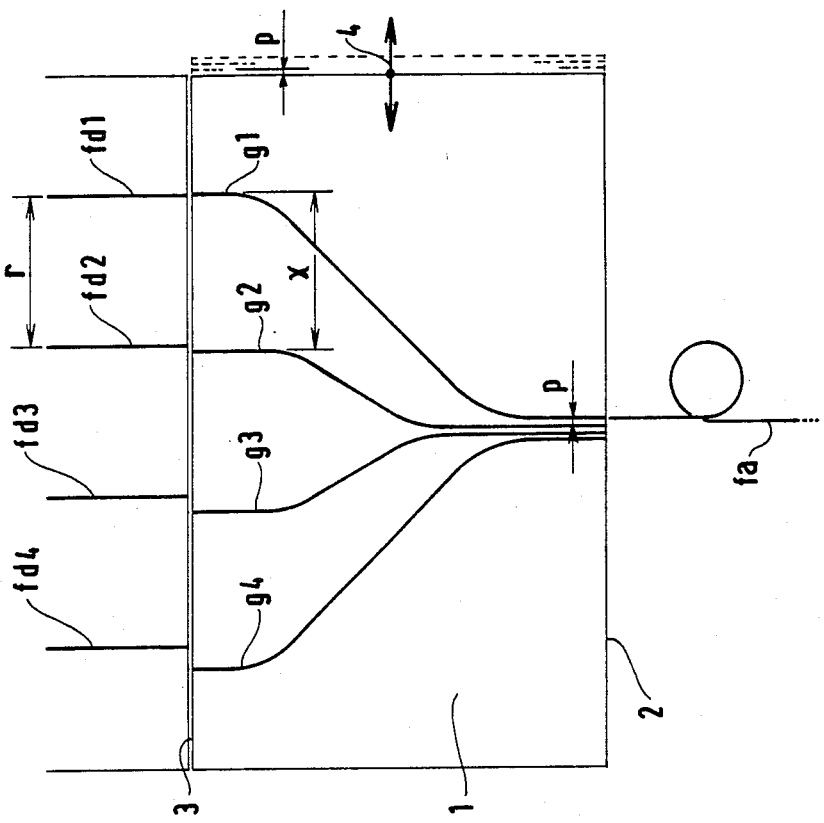
FIG. 1 is a schematic representation of a preferred embodiment of an opto-mechanical switch as applied in the invention.

In FIG. 1 there is illustrated one embodiment of an opto-mechanical switch of the optical fiber switching type for selectively coupling one end faces of a first optical element, for example an optical fiber fa called the subscriber fiber, and one end faces of a second optical element from a plurality of P second optical elements; in the embodiment shown these second optical elements are also optical fibers fd1 to fd4, called the second optical fibers and four in number (P=4). The relevant end faces of these second optical fibers fd1 to fd4 are arranged along a line at regular intervals r.

The opto-mechanical switch disposed between the end face of the fiber fa and the end faces of the second fibers fd1 to fd4 consists of a rectangular flat rigid optical assembly 1. This optical assembly 1 incorporates as many individual waveguides, namely four waveguides g1 to g4, as there are second optical fibers fd1 to fd4. In the optical assembly 1, these waveguides spread in a bundle from a first edge 2 of the assembly, at which they have first ends which are substantially aligned at regular intervals p, to a second edge 3 of the assembly, opposite the first, where they have second ends substantially aligned parallel to the first ends, with a regular interval x between them which is significantly greater than the interval p. This interval x between said second ends of the guides on the edge 3 is made equal to the interval r between the accesses of the second optical fibers fd on their line, incremented by the interval p, the interval r being also significantly greater than the interval p.

The optical assembly is positioned so that the end face of the fiber fa is facing and at a very small distance (of the order of 10 μm) from the line defined by the first end of the waveguides g1 to g4 on the first edge 2 of the assembly 1 and the line of end faces of the fibers fd1 to fd4 is facing and also at a very small distance (of the order of 10 μm) from that defined by the second ends of the waveguides g1 to g4 on the second edge 3 of the optical assembly 1. It is driven in translation in front of the end face of the optical fiber fa, parallel to the common direction of the lines of the first ends and the second ends of the waveguides g1 to g4, as schematically indicated by the double-ended arrow 4. This translation is effected with the increment p and provides for the simultaneous bringing into face to face relationship of two ends of one of the guides g1 to g4 with the end face of the fiber fa and the end faces of that of the fibers fd1 to fd4 of the same rank as that of the guide in question, respectively, for coupling these two end faces, for ech of the four different positions of the rigid optical assembly 1 in front of the end faces.

From the schematic representation given in FIG. 1 it will be readily understood that the second optical elements may be P in number (P≠4) in their line. The optical assembly would then also comprise P waveguides.

For example, with 16 fibers fd each of 40/45 μm and an optical assembly 1 having 16 guides g of 45/50 μm, the increment p would be choosen as 0.2 mm, the interval r between the accesses of the fibers fd would be 5 mm and the interval x would be 5.2 mm, for example. The fiber fa could have an outside diameter of 125 μm.

In an alternative arrangement to that of FIG. 1, the acesses of the second fibers fd would still be on a line but would not be regularly spaced. Under these conditions, the second ends of the guides, on the edge 3 of the optical assembly, would have the same interval xi between them as the interval ri between the end faces of the optical fibers fd of the same rows, increased by the increment p between the first ends of these guides, this increment p being advantageously made constant to facilitate control of translational movement through the increment p of the optical assembly 1 in front of the end faces.

Figure 2:
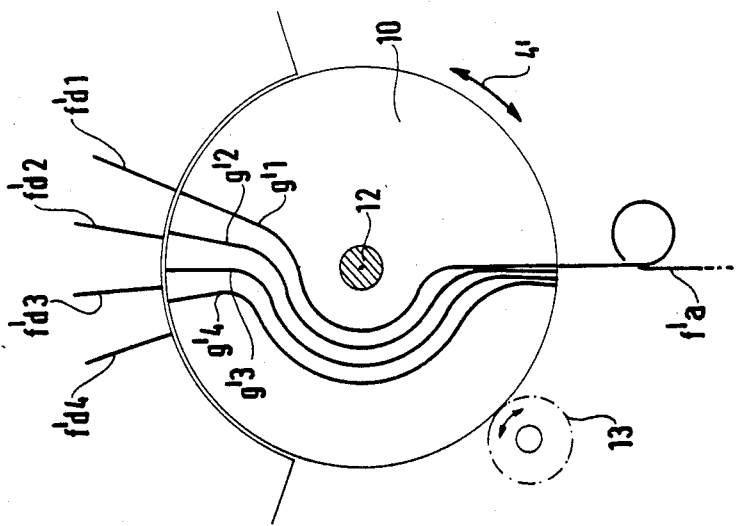
FIG. 2 is a schematic representation of an alternative embodiment of this opto-mechanical switch.

In FIG. 2 there is schematically represented an alternative embodiment of the previous opto-mechanical switch. In this variant the fibers to be coupled are designated by the same reference numerals as previously followed by an apostrophe, as are the individual waveguides of the optical switching assembly, which is designated by the reference numeral 10.

This optical assembly 10 is in the form of a wafer with the first ends and the second ends of its waveguides g'1 to g'4 disposed on the edge of the wafer, along two substantially circular arcs opposite one another. The wafer is disposed between the end face of the optical fiber f'a positioned opposite the arc defined by the first ends of the guides g'1 to g'4 and the end faces of the second fibers positioned opposite the arc defined by second ends of the guides, being at a very small distance from the end faces to be coupled. The end faces of the second fibers f'd1 to f'd4 are disposed in a circular arc with the same center as that defined by the second ends of the waveguides g'1 to g'4 and of very slightly larger radius. On the edge of the wafer the first ends of the guides are very closely and regularly spaced in the angular sense and the second ends of these guides are at angular intervals selected equal to that between the end faces of the second optical fibers f'd of the same rank reduced by the angular increment between the first ends, the angular increment between the end faces of the second optical fibers f'd being significantly greater than that between the first ends of the guides g'1 to g'4. The switching or coupling of the end face of the optical fiber f'a to the access of one of the second optical fibers f'd1 to f'd4 is achieved, as schematically represented by the double-ended arrow 4', by rotation of the rigid assembly around the central axis 12 of the assembly 10, through an angle equal to the angular increment between the first ends of its waveguides, this rotation being effected by a drive wafer 13 coupled to the assembly 10 over a peripheral portion at which there is no guide end.

The rectangular or circular flat rigid opto-mechanical switch, together with its internal waveguides, may with advantage consist of a plate of glass in which said waveguides are created by diffusing ions into the glass so as to produce an integrated structure such as is described, for example, in an article entitled "Planar multimode devices for fiber optics" by G. L. Tangonan and others presented to the Optical Communication Conference, Amsterdam, 17–19 Sept. 1979, or in an article entitled "Fast fabrication method for thick and highly multimode optical waveguides" by G H Chartier and others published in Electronics Letters volume 13, No 25 of Dec. 8, 1977.

This switch may also be made by encapsulating individual fibers constituting the waveguides in an epoxy resin charged with silica or by moulding these optical fibers into glass with a melting point of the order of 500° and with a low coefficient of thermal expansion of minimise stresses on cooling.

Apart from the advantage of possible implementation as an integrated structure, and independent of its rectangular or circular shape, the resulting opto-mechanical switch constitutes a geometric concentrator which makes its possible to reduce the amplitude of the movement to be carried out to ensure switching and consequently to improve the coupling quality and reliability of the switch, a close tolerance on the relative positioning of the movable parts being easier to achieve with low amplitude relative displacement. This switch also constitutes a modular element which makes it easy to constitute an optical selection assembly by simple stacking of modular elements or by overall implementation as an integrated structure, for the use of a plurality of switches of this kind in a space-division switching assembly which would then be highly compact.

Figure 3:
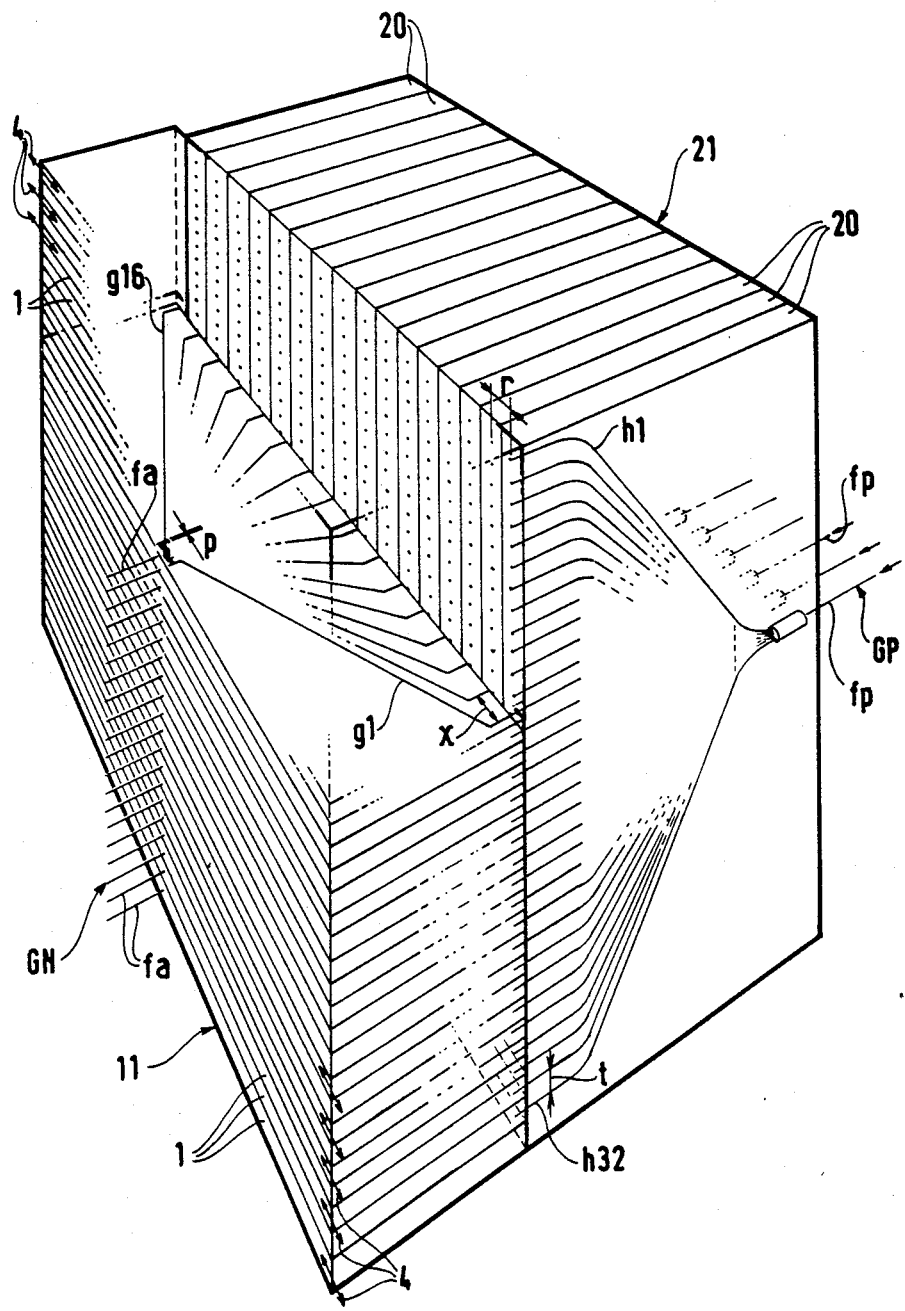
FIG. 3 is a schematic representation of a space-division optical switching assembly in accordance with the invention, in particular for broadcasting a plurality of programs to various subscribers, using switches like that of FIG. 1.

FIG. 3 shows a space-division optical switching assembly between the end faces of a first group GN of N separate optical elements fa and the end faces of a second group GP of P separate optical elements fp. This space-division optical switching assembly comprises 10 opto-mechanical switches of the kind shown in FIG. 1, individually designated by the reference numeral 1 assigned to the switch in FIG. 1, for the selective coupling to be achieved between the end faces of the N optical elements and those of the P optical elements. These N switches constitute an optical selection assembly 11.

This space-division optical switching assembly is described in the context of its application to optical broadcasting of P programs to N subscribers, these P programs being individually transmitted over P separate optical fibers fp whereas to the N subscribers there are assigned N optical fibers fa each of which can receive any one of the P programs. It is hereinafter referred to as the optical program broadcast unit. By way of examle, the description refers to 16 programs to be broadcast to 32 subscribers (P=16, N=32).

The optical broadcast unit comprises a first stack of 16 optical program distribution plates 20 identical to one another and each designed to distribute one of the 16 different programs to each subscriber. These 16 distribution plates constitute an optical distribution assembly 21. Each of the plates 20 comprises 32 optical guides h1 to h32, referred to as distribution guides for one of the programs. These 32 guides have first end faces coupled in common to the end face of the program fiber fp assigned to the plate in question and second end faces referred to as output end faces for this program communicating with the same edge of this plate, on which they are disposed in a line at regular intervals t.

In this stack of program distribution plates 20, the distribution guides h1 to h32 of the various plates 20 have their output end faces for the various programs disposed on the same side of the stack. The 16×32 output end faces thus define 32 rows, each of 16 output end faces for the 16 different programs, along each of which the 16 output end faces are arranged to constitute 16 end faces for one of the opto-mechanical switches 1 and are thus spaced from one another by the interval r indicated in FIG. 1.

The 32 opto-mechanical switches 1 of the optical selection assembly 11, each assigned to one of the fibers fa of the group GN, are also mounted in a second stack in which the individual switches are disposed transversely to the program distribution plates 20. Each of these opto-mechanical switches comprises 16 individual waveguides, designated g1 to g16 in conformity with FIG. 1. These 16 waveguides have their first ends aligned and spaced from one another by the interval p along their line. In the stack of switches the first ends of the guides are on the same side and are in each line associated with the end face of the fiber fa assigned to the corresponding switch. The second ends of these guides are also aligned and spaced from one another by the interval x in their line. In each line, they are associated with the output end faces of one of the 32 rows of 16 output end faces for the 16 programs of the stack of plates 20.

In this optical broadcast unit, the interval between the switches of the optical selection assembly 11 defines the interval (designated t) between the output end faces for the same program on the edge of each of the distribution plates 20 of the optical distribution assembly 21. On the other hand, the interval between the plates 20 defines the interval r between the output end faces for the various programs disposed in a line, and therefore the intervals x and p between the second ends and the first ends respectively on each of the lines of the guides of each of the switches.

The switches are individually movable in translation in the direction of the arrow 4 in front of their line of 16 end faces for the 16 programs and the end face of their fiber fa. The optical broadcast unit, with switches moved individually in this way, thus broadcasts to each of the N subscribers the required one of the P possible programs, with the facility for transmitting the same program to more than one subscriber.

In the example shown in FIG. 3, the P second optical elements coupled to the respective guides of the P distribution plates are optical fibers, as previously indicated. Alternatively, they may be light sources emitting the program, each source consisting of a laser diode, for example, or advantageously of a plurality of laser diodes emitting the same program, this latter configuration offering the advantage of reducing modal noise by virtue of the superposition of the various laser modes, apart from offering enhanced reliability.

Figure 4:
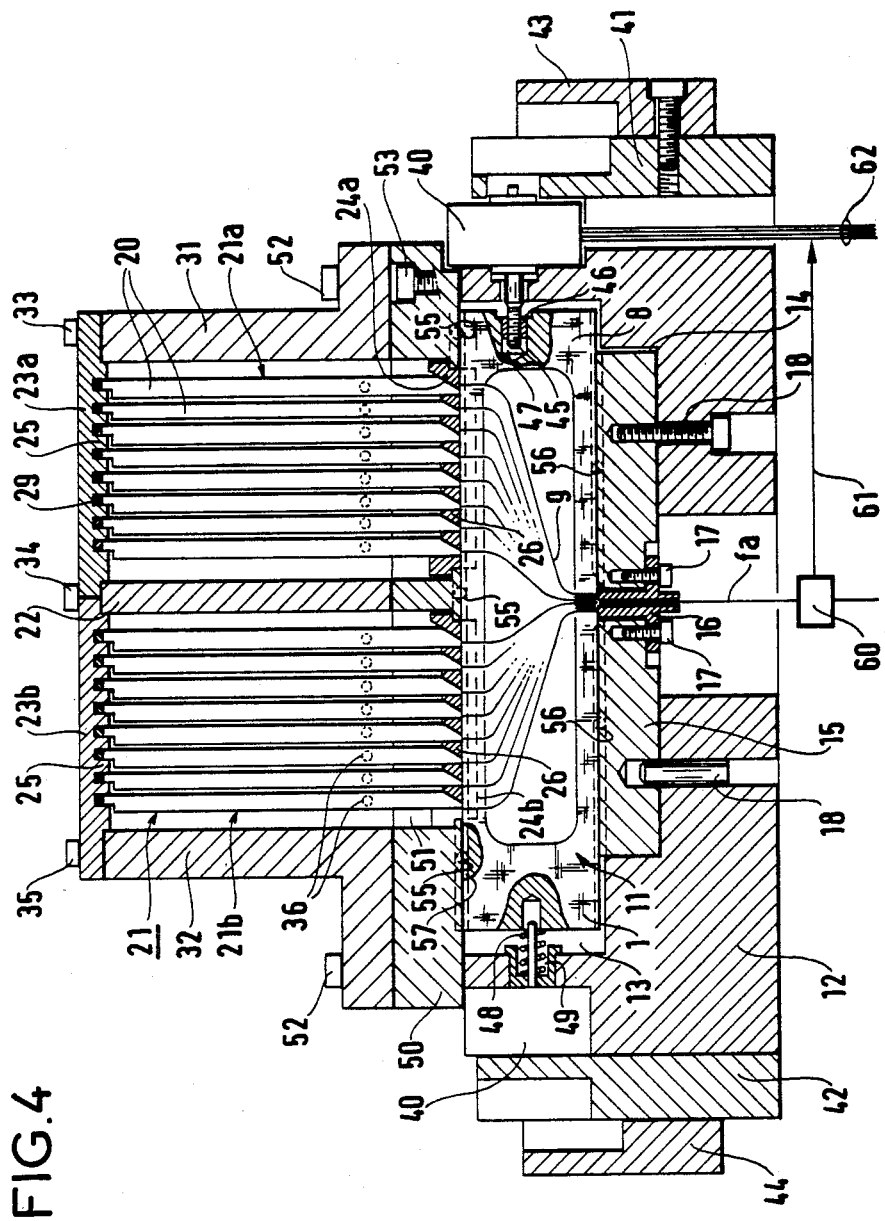
FIG. 4 represents a concrete embodiment of the switching assembly of FIG. 3.
Figure 5:
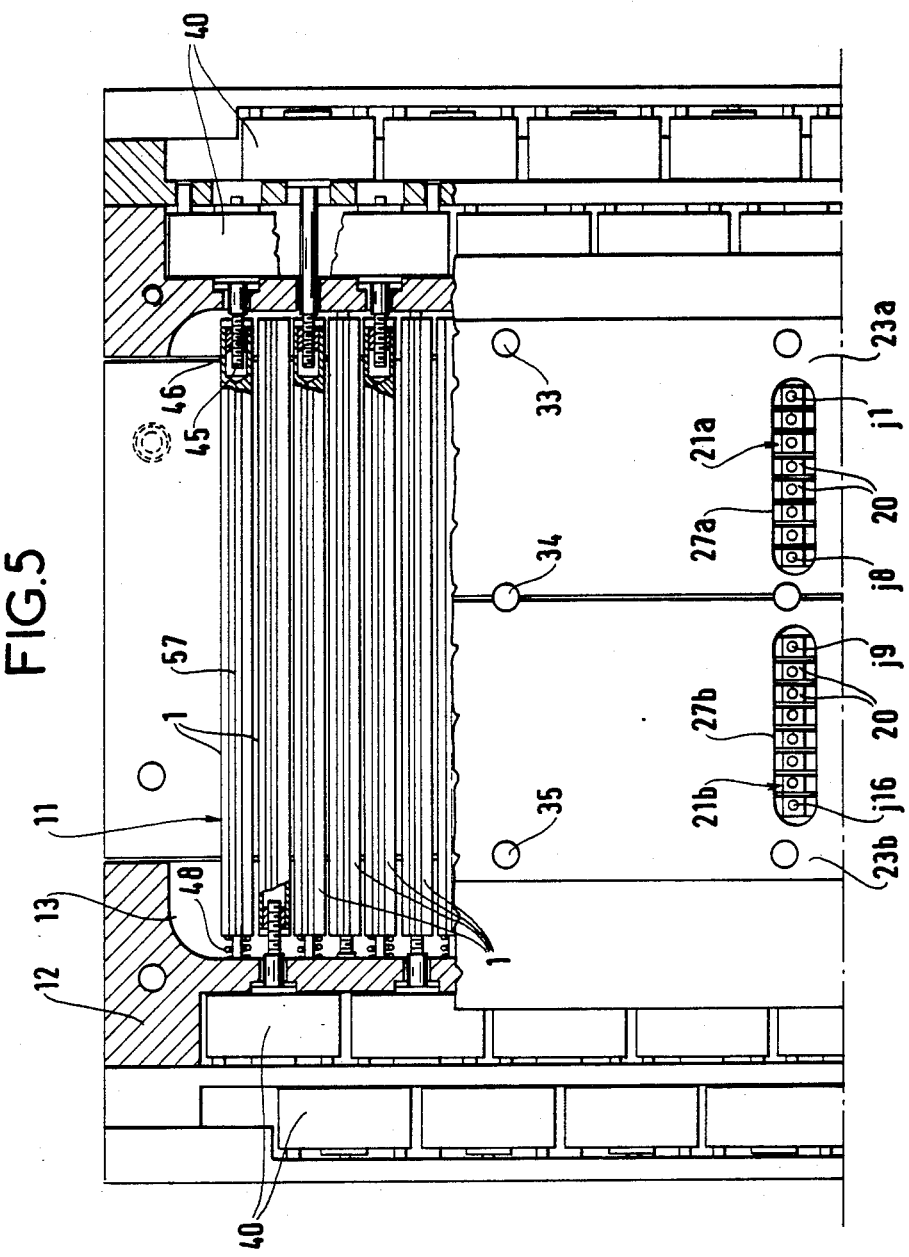
FIG. 5 is a partial plan view of the switching assembly of FIG. 4 shown partly in cross-section and partly cut away.

FIGS. 4 and 5 show a concrete embodiment of the optical broadcast unit shown schematically in FIG. 3. Corresponding elements are indicated by the same reference numerals.

The stack of 16 program distribution plates 20 forming the optical distribution assembly 21 is made up by constructing identical subassemblies 21a and 21b each of eight plates, separated in the assembly 21 by a central spacer 22. Each subassembly 21a, 21b is made up between two grids for positioning the plates 20, grids 23a and 24a for subassembly 21a and grids 23b and 24b for subassembly 21b. These grids 23a, 24a and 23b, 24b feature ribs 25 and 26 between which are engaged the opposite edges of the various plates 20, into which open the end faces of their internal guides (not shown in these figures).

The ribs 25 between which are accommodated the edges of the plates 20 which carry the first end faces of their guides to be coupled to the program fibers are of rectangular cross-section. The corresponding grid 23a, 23b features a window 27a, 27b (FIG. 5) into which open the eight common coupling end faces, designated j1 to j8 and j9 to j16 for each of the subassemblies 21a, 21b, between the individual guides for the various plates 20 and the end faces of the eight program fibers assigned to the subassembly in question. These grids 23a and 23b also carry resilient fingers 29, of rubber, for example, which touch the bottom of the grooves delimited by their ribs 25 for clearance-free positioning of the plates 20 in the optical broadcast unit which finally results.

The ribs 26 receiving the edge of the plates 20 which carry the second end faces of their guides to be coupled to the second ends of the guides g of one of the switches 1 each have one side chamfered for extremely precise positioning of this edge of the plates and of the second end faces of their guides in the resulting subassembly.

These two subassemblies 21a and 21b are fastened to the central spacer 22 and to two side flanges 31 and 32 by means of screws such as 33, 34 and 35.

To constitute the optical selection assembly 11 the switches 1 each comprise a peripheral armature 8 of an alloy based on aluminum, for example. This armature 8 is attached and fixed, as by glueing, for example, to the integral structure optical assembly produced, or is used for prepositioning the ends of the individual fibers prior to moulding or encapsulation.

The optical selection assembly 11 is formed on a retaining cradle 12 featuring a groove 13 receiving the stack of 32 switches, whilst leaving clearance between these switches and the lateral edges of the groove 13. This cradle 12 features another groove 14, opening into the bottom of the aforementioned groove 13, receiving a plate 15 for retaining fiber-carriers 16 for the subscriber fibers fa. These fiber-carriers 16 are fixed by pairs of screws 17 to the plate 15 while the latter is fixed by pairs of screws 18 to the cradle 12, ensuring precise positioning of each subscriber fiber in front of the first ends of the guides g of the switch to which it is assigned.

The cradle and side supports 41 and 42 associated with it carry individual motors 40 for the various switches 1. These motors 40 are mounted on alternate sides of the assembly 11 of switches and are alternately offset on each side of the assembly, for reasons of space; they are thus organised in two rows on each side of the cradle and on the associated side support. Two lateral end flanges 43 and 44 fixed to the supports 41 and 42 contribute to retaining the motors in the outside rows in position.

Each switch 1 is commanded in translation by its own individual motor 40 through a lead screw 45 driven by the motor. This screw 45 is engaged in a threaded bush 46 which is mounted laterally in the switch which it operates in translation and retained in a cylindrical recess 47 formed in the peripheral armature of the switch for longitudinal relative movement of the screw 45 when it is driven in rotation.

Springs 48 functioning in tension are individually associated with the switches 1, for precise control of the displacement of each of them by their motor and their actuator screw. Each of these springs 48 is mounted, opposite the associated drive motor, against one of the side edges of the groove 13 in the cradle 12, in which it is partially accommodated in a retaining cage 49 which is formed there, and against the facing edge of the armature 8 of the switch 1 concerned; it compensates any play affecting the lead screw 45 on displacement of the switch.

The resulting optical distribution assembly 21 and the resulting optical selection assembly 11 to which the subscriber fiber retaining assembly is attached are fastened at right angles to one another on an intermediate plate 50 formed with a central opening 51 in which the coupling between their guides is effected. Screws 52 retain the distribution assembly 21 on this intermediate plate 50, while other screws 53 retain the selection assembly 11 on the intermediate plate. The resulting optical broadcast unit is further equipped with final adjustment screws such as 36 operating on the edges of the distribution plates 20 which are free of guide end faces, for precise final positioning of these facing the individual switches.

Two sets of guide balls 55 individually guide the switches 1 of the selection assembly 11 relative to the distribution assembly 21. Two other sets of balls 56 similarly and individually guide the switches 1 of the selection assembly 11 relative to the plate 15 retaining the fiber-carriers 16 for the subscriber fibers fa.

The sets of balls 56 and the sets of balls 55 are mounted identically between the elements which they guide relative to one another. To each switch there is assigned a set of three balls 55 and a set of two balls 56. As can be seen in FIG. 4 in the case of the balls assigned to the switch 1 illustrated, two of the three balls 55 are mounted one on each side of the second accesses of the switch guides. Each of these two balls 55 is partially accommodated in a corresponding groove in the intermediate part 50 and its remainder is accommodated in a groove formed in a switch, the length of these grooves being at least equal to half the maximum amplitude of the displacement of the switch relative to the distribution assembly 21. The third ball of 55 is analogously mounted between the central spacer 22 of the distribution assembly 21 and the central part of the switch 1, this switch having its guides divided into two parts which are offset relative to one another to allow for the spacer 22 in the distribution assembly 21.

The two balls 56 are also mounted analogously, one on each side of the first end faces of the guides of the switch and one on each side of the fiber-carriers 16 on the retaining plate 15.

The grooves formed in the switch 1 for guiding the balls 55 could, as shown here, constitute a single groove, references 57, running over the full length of the switch and offset relative to the line of the second end faces of the guides of the latter.

In FIG. 4, for the purposes of a complete description of the optical broadcast unit, there is further shown an optical coupler 16 mounted on the subscriber fiber fa illustrated. This optical coupler 60, of a type known per se, transmits to the subscriber the selected program but also transmits the program selection commands issued by the subscribers; it comprises, for example, a semi-reflecting mirror mounted between a focussing lens and a collimator lens. Each program selection command for the subscriber is transmitted from the coupler 60 over a link 61 and, after detection in a control circuit for the motor 40 concerned (not shown), applied to this motor. There are also schematically represented by means of the links 62 the individual power supply wires to the motors 40.

It will be noted that to avoid any risk of incorrect positioning of the switches in response to the program selection commands issued by the various subscribers, means (not shown) could be provided to mark the position of each of the switches by providing, for each of them, a binary code representative of the position of the switch and enabling movement of the switch to be controlled by comparison with the program selection command issued by the corresponding subscriber, until the position it occupies is that which selects the program the subscriber requires.

Such marker means may comprise, for example, plates (five in number for $2^4 \leq P = 16 \leq 2^5$, identical to the distribution plates 20 and incorporated with the latter in the distribution assembly 21, these additional plates being fed with a continuous light signal, additional waveguides in switch 1, in this instance 33 in number for each switch, and photodiodes associated with each switch, equal in number to the additional plates in each case.

The five additional plates in the distribution assembly would be added at one end of the stack of 16 distribution plates 20 and each would have the first end faces of their 32 waveguides coupled in common to the end face of one optical element (fiber or source) to receive from the latter a continuous light signal, whereas the second end faces of their 32 guides, or additional output end faces, would define 32 rows of five end faces situated at the regular interval r.

The 33 additional waveguides of each switch would be disposed at one end of the switch, made long enough to incorporate the 33 additional waveguides of which the ends would be assigned to coupling with the five additional output end faces of one of the 32 rows and of which the other ends, communicating for example with the edge of the switch facing the corresponding subscriber fiber, would be assigned to coupling with the five photodiodes associated with the switch. These would then be aligned facing this edge, opposite the five respective additional output end faces. They would also be connected to the drive control circuit of the switch in question.

The 33 additional waveguides of each switch would be arranged to permit the recovery of a respective 5-bit code from the outputs of the photodiodes associated with this switch for each of the 16 different positions of the switch for which coupling is effected between the end faces of the subscriber fiber concerned and the end face of one of the program fibers.

FIG. 6 is a schematic representation of one arrangement of these additional waveguides formed in the switch relative to the additional output end faces designated s1 to s5 and to the photodidoes designated v1 to v5. These additional waveguides form five successive groups m1 to m5 comprising, in so far as a first group m1 is concerned, a single waveguide and, in so far as the next four groups m2 to m5 are concerned, eight waveguides each, the waveguides of the same group being intended to face a common additional output end face for various positions of the switch among its 16 possible coupling positions, the five groups of additional waveguides thus corresponding to the respective five additional output accesses. In the second group m2 of additional waveguides, that is to say the group immediately following the first group m1, the guides would be disposed at the drive increment p of the switch, the first guide of the second group being at a distance of (r−8p) from the single guide of the first. In the third group m3 of additional waveguides, the latter form two packets of four guides disposed at the increment p, the first guides of the two packets being 8p apart and the first guide of this third group being at a distance of (r−4p) from the first guide of the second group. In the fourth group m4 of additional waveguides, the latter would form four packets of two guides spaced by p, the first guides of two consecutive packets being spaced by 4p and the first guide of this fourth group being at a distance of (r−2p) from the first guide of the third group. In the fifth group m5 of additional waveguides, the latter would be disposed regularly at twice the increment p, the first guide of this fifth group being at a distance of (r−p) from the first guide of the fourth group.

It will be noted that the increments r and p are chosen so that the first is more than (P−1) times the latter, that is in this instance r is more than 15 times p.

In FIG. 7 there is shown one embodiment of a plate 20 for distributing one of the programs, conforming to that shown in FIGS. 3, 4 and 5. This plate 20 comprises the 32 individual guides h1 to h32 (N=32) indicated in connection with FIG. 3, and a common guide j of which one of the two end faces communicates with an edge of the plate 20 and constitutes the common end face coupling the 32 guides h of this plate 20 to the end face of its program fiber, visible with one of the refrences j1 to j16 in FIG. 5. The common guide j, of larger cross-section than the individual guide h, has its second end face coupled in common directly to the first ends of the 32 individual guides h. The second ends of these individual guides extend in a line along the edge of the plate 20 opposite the terminal end face of the guide j, at the aforementioned interval t.

This distribution plate 20 comprises, like the switches 1, a peripheral armature 38, of an aluminum based alloy, for example.

It will be understood that various changes in the details, materials and arrangements of parts which have been herein described and illustrated in order to explain the nature of the invention may be made by those skilled in the art within the principle and scope of the invention as expressed in the appended claims.

The distribution plate 20 could, like the switches 1, be embodied in an integrated structure, the peripheral armature being then attached and glued to the glass plate comprising the waveguides h which are created in it. Like the switches 1, the plates 20 could also, as shown here, be obtained by molding in glass or encapsulating in an epoxy resin charged with silica individual fibers h and j the ends of which would be prepositioned and glued to a frame which would constitute the aforementioned final armature 38. In this latter embodiment, the ends of the guides h coupled directly in common to the end of the guide j would be combined, as is known, into a compact hexagonal array comprising several layers, whereas the other ends of the guides h and the other end of the guide j carried by the armature and coated with glue and the moulding or encapsulation product would be flattened by polishing the edges of the armature which carries them.

There is claimed:

1. A space-division optical switching assembly for selectively coupling any one of N first optical elements to any one of P second optical elements, said switching assembly comprising:
    an optical distribution assembly comprising a stack of P optical distribution plates each corresponding to a respective one of said second optical elements and each incorporating N individual waveguides having first end faces coupled in common to the end face of the respective second optical element and the waveguides in any one distribution plate having second end faces communicating with the edge of said one plate, the waveguides of the various plates having their second end faces arranged in N rows of P second end faces,
    an optical selection assembly comprising a stack of N flat rigid opto-mechanical switches each corresponding to a respective one of said first optical elements and each individually assigned to a respective one of the N rows of second end faces of the waveguides of said distribution plates, said switches being mounted between the N first optical elements and said stack of the plates transversely to said plates, each of said switches incorporating P waveguides having first ends assigned to the individual connections of these waveguides with the corresponding first optical element and spreading from their first ends to their second ends assigned individually to the P second end faces of the waveguides of the plates of the corresponding row, said second ends of the P waveguides of each switch being arranged relative to the P second end faces of the corresponding row and being arranged relative to said first ends of these P waveguides to provide for successive individual positioning of the second ends of the P waveguides each facing one of said P second end faces of said N waveguides whereas simultaneously, for each of these positions, the first end of the same waveguide is opposite the end face of the first optical element to which this switch is assigned, and
    means for driving each of said switches relative to the end face of the first optical element to which it is assigned and relative to the corresponding row of second end faces on the distribution assembly, for the purpose of obtaining P relative positions of this switch for each of which a particular first optical element is selectively coupled to a particular one of the second optical elements through only one of the waveguides of this switch and only one of the waveguides of the distribution plate assigned to the particular second optical element.

2. Space-division optical switching assembly according to claim 1, wherein, in each of said switches, the first ends of the waveguides have between them a space which is significantly smaller than that between the second ends of the same waveguides.

3. Space-division optical switching assembly according to claim 1, further comprising:
    first mechanical means for retaining and positioning said distribution plates in their stack, comprising at least one pair of grids with ribs and lateral flanges,
    second mechanical means for retaining and positioning said first optical elements comprising a retaining plate on which are mounted individual supports for these first optical elements,
    third mechanical means for retaining and positioning said switches in their stack, comprising a retaining cradle featuring a first central groove accommodating the switches, there being clearance between said switches and the lateral edges of said groove, and a second groove opening into the bottom of said first groove, in which is fixed said retaining plate for the individual supports for said first optical elements, and
    fourth means for retaining said distribution assembly and said selection assembly relative to one another, comprising an intermediate plate to which are fixed the first and third mechanical means and which features a central opening in which is effected coupling between the individual waveguides of said assemblies.

4. Space-division optical switching assembly according to claim 3, wherein said drive means for said individual switches are mounted laterally in said retaining cradle.

5. Space-division optical switching assembly according to claim 4, wherein said drive means comprise, for each switch, a motor operating a lead screw engaged laterally in the switch concerned, and a clearance compensator spring mounted laterally between said switch and the retaining cradle, opposite the lead screw.

6. Space-division optical switching assembly according to claim 3, further comprising a first set of guide balls mounted between said intermediate plate and each of said springs and a second set of guide balls mounted between the retaining plate for the individual supports for said first optical element and each of the switches, each of said balls being partially accommodated in grooves formed in the relatively guided elements, these grooves having a length which is at least equal to one half of the maximum amplitude of displacement of each switch.

7. Space-division optical switching assembly according to claim 1, wherein each switch comprises a peripheral armature.

8. Space-division optical switching assembly according to claim 1, wherein said optical assembly is formed by a thin transparent plate within which said waveguides are created by ion diffusion.

9. Space-division optical switching assembly according to claim 1, wherein said optical assembly consists of a rigid block based on glass within which are embedded said individual waveguides and of which the edges, carrying said ends of the guides, are polished and machined flat.

10. Space-division switching assembly according to claim 1, wherein each of said distribution plates further comprises a supplementary waveguide called the common guide providing coupling between the end faces of the second optical element assigned to the plate concerned and its N dividual waveguides.

11. Space-division optical switching assembly according to claim 10, wherein each of the distribution plates comprises a peripheral armature.

12. Space-division optical switching assembly according to claim 10, wherein each plate is of an epoxy resin charged with silica and within which the N waveguides and the common guide are embedded, the N waveguides being assembled into a hexagonal array facing this common guide.

13. Space-division optical switching assembly according to claim 10, wherein each plate is of glass within which are embedded the N waveguides and the common guide, the N waveguides being assembled into a hexagonal array facing this common guide.

14. Space-division optical switching assembly according to claim 10, wherein each distribution plate is formed by a glass plate within which are created by ion diffusion the N waveguides and the common guide which is coupled to them.

* * * * *